US 7,423,075 B2

(12) United States Patent
Ikegami et al.

(10) Patent No.: US 7,423,075 B2
(45) Date of Patent: Sep. 9, 2008

(54) POLYMER, POLYMER-CONTAINING COMPOSITION CONTAINING THE SAME, INK COMPOSITION, AND INK APPLYING METHOD, IMAGE FORMING METHOD AND IMAGE FORMING APPARATUS WHICH MAKE USE OF INK COMPOSITION

(75) Inventors: Masayuki Ikegami, Atsugi (JP); Koichi Sato, Atsugi (JP); Ikuo Nakazawa, Zama (JP); Ryuji Higashi, Atsugi (JP); Sakae Suda, Sagamihara (JP); Keiichiro Tsubaki, Kawasaki (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 11/118,401

(22) Filed: May 2, 2005

(65) Prior Publication Data

US 2005/0249925 A1    Nov. 10, 2005

(30) Foreign Application Priority Data

May 7, 2004    (JP)    ............................. 2004-139055

(51) Int. Cl.
*C09D 11/00* (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS

| 5,085,698 | A | 2/1992 | Ma et al. ...................... 106/20 |
| 5,713,993 | A | 2/1998 | Grezzo Page et al. .... 106/31.85 |
| 7,004,579 | B2 | 2/2006 | Sato et al. ................... 347/105 |
| 2002/0186288 | A1 | 12/2002 | Nakazawa et al. .......... 347/100 |
| 2003/0050364 | A1 | 3/2003 | Sato et al. .................... 523/160 |
| 2004/0024154 | A1* | 2/2004 | Schinabeck et al. ......... 526/287 |
| 2005/0033010 | A1 | 2/2005 | Sato et al. ...................... 528/80 |
| 2005/0131102 | A1 | 6/2005 | Nakazawa et al. .......... 523/160 |
| 2005/0140762 | A1 | 6/2005 | Sato et al. .................... 347/100 |
| 2005/0197424 | A1 | 9/2005 | Higashi et al. .............. 523/160 |
| 2005/0209367 | A1 | 9/2005 | Sato et al. .................... 523/161 |
| 2005/0219277 | A1 | 10/2005 | Sato et al. ....................... 347/1 |
| 2005/0239918 | A1 | 10/2005 | Nakazawa et al. .......... 523/160 |
| 2005/0249925 | A1 | 11/2005 | Ikegami et al. ........... 428/195.1 |
| 2006/0004124 | A1 | 1/2006 | Tsubaki et al. .............. 523/160 |
| 2006/0047015 | A1 | 3/2006 | Duda et al. .................. 523/160 |
| 2006/0050117 | A1 | 3/2006 | Sato et al. .................... 347/100 |
| 2006/0057485 | A1 | 3/2006 | Teshima et al. ........... 430/108.8 |

FOREIGN PATENT DOCUMENTS

| EP | 1285948 | * | 2/2003 |
| JP | 64-63185 | | 3/1989 |
| JP | 11-322942 | | 11/1999 |

OTHER PUBLICATIONS

Aoshima et al., "Living Cationic Polymerization of Vinyl Monomers by Organoaluminum Halides," Polymer Bulletin, vol. 15, pp. 416-423 (1986).

Etsu Takeuchi, et al., "Living Cationic Polymerization of Ethyl 2-(Vinyloxy) ethoxyacetate: A Vinyl Ether with an Ether and an Ester Function in the Pendant," Journal of Polymer Science, vol. 27, pp. 3303-3314 (1989).

* cited by examiner

*Primary Examiner*—Edward J Cain
(74) *Attorney, Agent, or Firm*—Fitzpatrick, Cella, Harper & Scinto (57) ABSTRACT

A polymer having a specific repeating structural unit having in the side chain at least one selected from a sulfonic acid, a sulfonic acid ester and a sulfonic acid salt and a specific repeating structural unit having in the side chain at least one selected from a carboxylic acid, a carboxylic acid ester and a carboxylic acid salt.

13 Claims, 1 Drawing Sheet

FIGURE 1

POLYMER, POLYMER-CONTAINING COMPOSITION CONTAINING THE SAME, INK COMPOSITION, AND INK APPLYING METHOD, IMAGE FORMING METHOD AND IMAGE FORMING APPARATUS WHICH MAKE USE OF INK COMPOSITION

BACKGROUND OF THE INVENTION

1. Field of the Invention

This invention relates to a novel polymer useful as various functional materials, a polymer-containing composition containing the same, an ink composition, and an ink applying method and an ink applying apparatus that make use of the ink composition. More particularly, this invention preferably relates to a recording material, including an ink composition, that makes use of such a polymer together with a solvent or a dispersion medium and a coloring material, and also relates to an ink applying method and an ink applying apparatus that make use of such an ink composition.

2. Related Background Art

Aqueous dispersion materials containing functional substances are conventionally well known to contain, as functional materials, agricultural chemicals such as herbicides and insecticides; pharmaceuticals such as carcinostatics, antiallergic agents and antiphlogistics; and coloring materials such as inks and toners having colorants. In recent years, digital printing technique has made very dramatic progress. This digital printing technique is, as its typical example, what is called electrophotographic technique or ink jet technique, and is more and more making its presence felt as an image forming technique used in offices, homes and so forth.

In particular, the ink jet technique has great characteristic features such as compactness and low power consumption as a direct recording method. Also, image quality is rapidly being made higher as nozzles are made finer. An example of the ink jet technique is a method in which an ink fed from an ink tank is heated with heaters in nozzles to cause evaporation to bubbling, whereupon the ink is ejected to form images on a recording medium. Another example is a method in which the ink is ejected from nozzles by vibrating piezoelectric elements.

As inks used in such methods, aqueous dye solutions are usually used, and hence colors may blur when they are superimposed, or a phenomenon called feathering may occur in the direction of fibers of paper at recorded areas on a recording medium. For the purpose of making improvements on these, the use of pigment-dispersed inks has been studied (see U.S. Pat. No. 5,085,698). In a reported example of a pigment dispersing method, a polymer having a sulfonic group is used (see U.S. Pat. No. 5,713,993). However, there remains a need to make more improvements.

In the production of ink compositions or toner compositions, it has also conventionally frequently been put into practice to disperse a coloring material in a solution in which a binder resin has been dissolved. In general, styrylic, acrylic or methacrylic polymers are used as binder resins used in dispersing pigments by the wet process. Then, in preparing pigment inks composed of a solvent, in particular, water as a base material, it is considered preferable to use a high-molecular material having an ionic functional group.

Meanwhile, a polymer having a polyalkenyl ether backbone chain is also known as a high-molecular material having a flexible high-molecular chain. It, however, is little put into practice to introduce an ionic functional group into a repeating unit of such a polymer. A disclosure is slightly seen on a carboxylic acid and an ester thereof as one having a possibility therefor (see Journal of Polymer Science Part A, Polymer Chemistry, Vol. 27, pp. 3303-3314, 1989). Under the existing conditions, however, it is sought to provide a stabler polymer.

SUMMARY OF THE INVENTION

The present invention intends to provide a polymer which enables good dispersion of functional substances in solvents.

The present invention also intends to provide a polymer-containing composition and an ink composition which have good dispersibility, containing the above polymer.

The present invention also provides ink applying method and apparatus, an image forming method and a medium for image formation which make use of the above compositions.

The polymer provided by the present invention is a polymer characterized by containing a repeating structural unit represented by the following general formula (1) and a repeating structural unit represented by the following general formula (2):

General formula (1)

wherein A represents a substituted or unsubstituted polyalkenyl group; B represents any one of structures selected from —O—, —OCO—, —COO—, CONR$^1$— and —CH$_2$—, where R$^1$ represents a hydrogen atom or a substituted or unsubstituted straight-chain or branched alkyl group having 1 to 3 carbon atoms; D represents a substituted or unsubstituted straight-chain or branched alkylene group having 1 to 15 carbon atoms, and the methylene group in the alkylene group may be substituted by an oxygen atom or an aromatic ring; m represents an integer of 0 to 30 and, when m is 2 or more, each D may be different; E represents a substituted or unsubstituted aromatic ring; n represents an integer of 0 to 10 and, when n is 2 or more, each E may be different; provided that m+n is 1 or more; and R represents —SO$_3$H, SO$_3$R$^2$ or —SO$_3$-M, where R$^2$ represents a substituted or unsubstituted straight-chain or branched alkyl group having 1 to 5 carbon atoms or a substituted or unsubstituted aromatic ring, and M represents a monovalent or polyvalent cation; and General formula (2)

wherein A represents a substituted or unsubstituted polyalkenyl group; B' represents any one of structures selected from —O—, —OCO—, —COO— and CONR$^1$, where R$^1$ represents a hydrogen atom or a substituted or unsubstituted straight-chain or branched alkyl group having 1 to 3 carbon atoms; D represents a substituted or unsubstituted straight-chain or branched alkylene group having 1 to 15 carbon atoms, and the methylene group in the alkylene group may be substituted by an oxygen atom or an aromatic ring; m represents an integer of 0 to 30 and, when m is 2 or more, each D may be different; E' represents a substituted or unsubstituted alkyl group or aromatic ring; n' represents an integer of 1 to 10 and, when n is 2 or more, each E' may be different; R' represents —COOH, —COO$_2$ or —COO-M, where R$^2$ represents a substituted or unsubstituted straight-chain or branched alkyl group having 1 to 5 carbon atoms or an aromatic ring, and M represents a monovalent or polyvalent cation; and l is 1 or more.

The present invention also embraces a polymer-containing composition characterized by containing the polymer of the present invention, a solvent or a dispersion medium and a functional substance.

The present invention also embraces an ink composition characterized in that the above functional substance is a coloring material.

The present invention still also embraces an ink applying method having the step of applying the ink composition of the present invention to a medium. In the ink applying method of the present invention, the medium may previously be provided with a substance or composition capable of changing the pH of the ink composition.

The present invention further embraces a medium for image formation which is a medium to which an ink composition is to be applied to form an image thereon, and is characterized by having a substance or composition capable of changing the pH of the ink composition upon its contact with the ink composition.

The present invention still further embraces an ink applying apparatus characterized by having an ink applying means for causing energy to act on the ink composition of the present invention to apply an ink to a medium and a driving means for driving the ink applying means.

The present invention can provide a novel polymer, and a block polymer compound which enables good dispersion of functional substances in solvents.

The present invention can also provide a polymer-containing composition and an ink composition having good dispersibility, by using the above block polymer compound.

The present invention can still also provide an image forming method and an image forming apparatus which make use of the above composition having good dispersibility.

DESCRIPTION OF THE PREFERRED EMBODIMENTS

In the polymer of the present invention, the aromatic ring indicates a structure having non-localized cyclic $\pi$ electron clouds above and below the molecular plane, as in benzene.

The polymer of the present invention is characterized by being a polymer containing the repeating structural unit represented by the general formula (1), having a sulfonic acid, or a sulfonic acid derivative as exemplified by a sulfonic acid ester such as methyl sulfonate, ethyl sulfonate or propyl sulfonate or a sulfonic acid salt such as sodium sulfonate, potassium sulfonate or ammonium sulfonate, and the repeating structural unit represented by the general formula (2), having a carboxylic acid, or a carboxylic acid derivative as exemplified by a carboxylic acid ester such as methyl carboxylate, ethyl carboxylate or benzyl carboxylate or a carboxylic acid salt such as sodium carboxylate, potassium carboxylate or ammonium carboxylate.

The sulfonic acid or the sulfonic acid salt has a high acidity as an acid, and hence, in an aqueous solution, protons or cations of the sulfonic acid or cations of the sulfonic acid salt may readily become liberated, and ions stand dissociation even in a low pH range, where, by virtue of the ionic repulsion, the sulfonic acid or the sulfonic acid salt can more stably disperse in the aqueous solution. Also, the polymer has in its interior a plurality of sulfonic acid groups which are highly dissociative ionic functional groups, and hence it is very useful also because of an advantage that it can be provided as a functional high-molecular material. Still also, the sulfonic acid or the sulfonic acid salt is often obtained by the hydrolysis of a sulfonic acid ester. Hence, such a sulfonic acid ester structure is very useful as a synthesis precursor of the sulfonic acid or sulfonic acid salt, and is very useful as a highly polar compound even in the form of the sulfonic acid ester.

In the repeating structural unit represented by the general formula (2), a carboxylic acid group is attached to the backbone chain via two or more atoms. It is not in the form that it is directly attached to the backbone chain, but the carboxylic acid, the carboxylic acid ester or the carboxylic acid salt is present via any linking group, and besides via a linking group having two or more atoms. This is not a state in which the carboxylic acid, the carboxylic acid ester or the carboxylic acid salt is present being attached in the form that its molecular motion is bound to the backbone chain as in, e.g., polymer macromolecules of acrylic acid, methacrylic acid and itaconic acid or derivatives thereof, but a state in which the carboxylic acid, the carboxylic acid ester or the carboxylic acid salt can have molecular motion via a linking group or the like such as an alkylene group or an alkyleneoxy group freely to a certain extent or more. The number of atoms of the linking group is 2 or more, preferably 3 or more, more preferably 4 or more, and still more preferably 5 or more.

This is because, in a structure in which the carboxylic acid, the carboxylic acid ester or the carboxylic acid salt is closely or directly attached to the backbone chain, its molecular motion is restricted and this may make it unable to well exhibit the mutual action that is to act intermolecularly and intramolecuarly. Accordingly, what can more be put into such mutual action may include a free carboxylic acid structure and a structure of carboxylic acid salt as preferable forms. However, such a free carboxylic acid structure and a carboxylic acid salt are often obtained by the hydrolysis of a carboxylic acid ester. Hence, the carboxylic acid ester structure, even though not so much capable of being put into mutual action intermolecularly and intramolecuarly, is very useful as a synthesis precursor of the free carboxylic acid structure and the carboxylic acid salt.

Thus, the polymer of the present invention, containing the repeating structural units represented by the general formulas (1) and (2), has the above functions together and further contains in the same polymer the sulfonic acid group and the carboxylic acid group, having different pKa. This enables control by pH, of the structure the polymer should have and the dissociation degree of protons or cations their ionic functional groups have. This is very useful also because of an advantage that the polymer can be provided as a functional high-molecular material.

In the present invention, the repeating structural unit represented by the general formula (1) and the repeating structural unit represented by the general formula (2), contained in the polymer, may be contained in a ratio ranging from 1:99 to 99:1, preferably from 10:90 to 90:10, and more preferably from 30:70 to 70:30.

In the present invention, the polymer containing the repeating structural unit represented by the general formula (1) and the repeating structural unit represented by the general formula (2), contained in the polymer, may be a random copolymer in which the repeating structural units of the general formulas (1) and (2) are arranged at random, or an alternating copolymer in which the repeating structural units of the general formulas (1) and (2) are alternately arranged, or a gradi- ent copolymer in which the compositional ratio of the repeating structural units of the general formulas (1) and (2) gradually changes on.

The present invention may also be a polymer in which at least one unit of repeating structural units represented by the general formula (1) and at least one unit of repeating structural units represented by the general formula (2) are copolymerized, which may contain in plurality each of the repeating structural units represented by the general formulas (1) and (2), or may also contain a repeating structural unit(s) other than those represented by the general formulas (1) and (2).

Specific examples of the repeating structural unit represented by the general formula (1) include, but are not limited to, aliphatic sulfonic acid derivatives formed by combination of a sulfonic acid group with aliphatic carbon, which are obtained when n is 0 in the general formula (1), such as:

A preferred embodiment of the present invention may further include repeating structural units having in the side chain an aromatic sulfonic acid derivative formed by combination of a sulfonic acid group with aromatic carbon, which are obtained when n is 1 or more in the general formula (1). In the aromatic sulfonic acid derivative, by virtue of its attracting action, the carbon atom (α-carbon) to which the sulfonic acid group is bonded has so high an acidity that if the α-carbon has a hydrogen atom (α-hydrogen), the hydrogen atom tends to become liberated. Hence, an aromatic sulfonic acid having no α-hydrogen is more preferably used. Specific examples of such a repeating structural unit include, but are not limited to, the following.

-continued (Ph represents 1,4-phenylene or 1,3-phenylene; Pry represents 2,5-pyridyl; and Np represents 2,6-naphthyl, 1,4-naphthyl or 1,5-naphthyl.)

Specific examples of the repeating structural unit represented by the general formula (2) include, but are not limited to, monocarboxylic acid structures obtained when l is 1 in the general formula (2), such as:

(Ph represents 1,4-phenylene or 1,3-phenylene; Pry represents 2,5-pyridyl; and Np represents 2,6-naphthyl, 1,4-naphthyl or 1,5-naphthyl.)

Examples of the one obtained when l is 2 or more are shown below, but are not limited to these.

(Ph represents 1,3,5-phenylene; and Np represents 1,2,3-naphthyl, 1,2,4-naphthyl, 1,5,6-naphthyl, 1,5,7-naphthyl, 2,5,6-naphthyl or 2,5,7-naphthyl.)

The present invention may also be a block polymer having at least two block segments, which is a block polymer compound characterized by containing the repeating structural unit represented by the general formula (1) and having in the side chain at least one selected from a sulfonic acid, a sulfonic acid ester and a sulfonic acid salt and the repeating structural unit represented by the general formula (2) and having in the side chain at least one selected from a carboxylic acid, a carboxylic acid ester and a carboxylic acid salt. Incidentally, the block polymer referred to in the present invention is meant to be a copolymer in which different two or more block segment structures are connected on the polymer chain, and refers to what is called a block interpolymer or a block copolymer. Preferably, it is a block polymer compound which is amphiphilic.

Such an amphiphilic block polymer compound is a polymer compound having at least one segment for each of solvent-philic and solvent-phobic block segments. The "solvent-philic" expresses a property that the compound has a high affinity for a chief solvent used in a polymer-containing composition described later; and the "solvent-phobic", a property that the compound has a low affinity for the solvent. Where the solvent is water, it is preferable for the polymer compound of the present invention to have in its interior at least one segment for each of hydrophilic and hydrophobic block segments.

Inasmuch as at least one block segment in the block polymer compound of the present invention is hydrophobic and at least one block segment therein is hydrophilic, the amphiphilicity is brought out. Incidentally, the "hydrophilic" expresses a property that the compound has a high affinity for water and is readily soluble in water; and the "hydrophobic", a property that the compound has a low affinity for water and is sparingly soluble in water. For example, as a hydrophilic block, it may include a block segment containing repeating structural units having ionic hydrophilic units such as a sulfonic acid or a sulfonic acid salt as in those represented by the general formula (1) and a carboxylic acid or a carboxylic acid salt as in those represented by the general formula (2). It may also include structures containing many hydrophilic oxyethylene units and further repeating structural units having nonionic units such as a hydroxyl group. The hydrophilic block in the block polymer compound of the present invention is by no means limited to these. Also, as a hydrophobic block, it may include, e.g., repeating structural units having hydrophobic units such as an isobutyl group, a t-butyl group, a phenyl group, a biphenyl group and a naphthyl group. The hydrophobic block in the block polymer compound of the present invention is by no means limited to these.

A repeating structural unit preferably used as a block segment other than those represented by the general formulas (1) and (2) is exemplified in the following general formula (3). Examples are by no means limited thereto.

General formula (3)

wherein A represents a substituted or unsubstituted polyalkenyl group; B' represents any one of structures selected from —O—, —OCO—, —COO— and —CONR$^1$, where R$^1$ represents a hydrogen atom or a substituted or unsubstituted straight-chain or branched alkyl group having 1 to 3 carbon atoms; D' represents a substituted or unsubstituted straight-chain or branched alkylene group having 1 to 15 carbon atoms; m represents an integer of 0 to 30 and, when m is 2 or more, each D may be different; E' represents a substituted or unsubstituted alkyl group, alkylene group or aromatic ring, or a hydrogen atom; and n' represents an integer of 1 to 10 and, when n is 2 or more, each E' may be different.

Specific examples of the repeating structural unit represented by the general formula (3) include, but are not limited to, the following.

(Ph represents a phenylene group or a phenyl group.)

Each block segment of the block polymer of the present invention may be a segment formed of a single repeating structural unit, or a segment formed of a plurality of repeating structural units. Examples of the block segment formed of a plurality of repeating structural units include a random copolymer and a gradient copolymer in which the compositional ratio changes gradually. Also, the block polymer of the present invention is a block polymer having two or more block segments, and may be a polymer in which such a block polymer is grafted onto another polymer.

The block polymer compound of the present invention is also a block polymer compound having two or more block segments. The form of block structure may include the following examples: A di-block polymer called AB; an ABA tri-block polymer, in which the block segments on both ends are the same; and a tri-block polymer called ABC, in which the respective block segments are different. A block polymer in which other polymer unit(s) is/are attached to any of these tri-block structures may also be included in the present invention. For example, a block polymer having ABCD four different block segments, a block polymer having the form of ABCA and further a block polymer having more than four block segments may also be included in the present invention. The block polymer compound of the present invention is characterized by having at least two block segments.

In the present invention, the repeating structural unit represented by the general formula (1) may preferably be contained in the polymer in an amount ranging from 0.01 to 99 mol %, and preferably from 1 to 90 mol % based on the whole of the polymer. As long as the repeating structural unit represented by the general formula (1) is in an amount of from 0.01% or more to 99 mol % or less, the high-molecular mutual action that the sulfonic acid, the sulfonic acid ester or the sulfonic acid salt should have can be achieved.

The block polymer compound of the present invention may have a number-average molecular weight (Mn) of from 200 or more to 10,000,000 or less, and as a preferably usable range, from 1,000 or more to 1,000,000 or less. As long as it has a number-average molecular weight of 10,000,000 or less, the compound may have less entanglement of high-molecular chains in their interiors and between themselves, and may readily be dispersed in solvents. As long as it has a number-average molecular weight of 200 or more, it can have a preferable steric effect as the polymer. Each block segment may preferably have a degree of polymerization of from 3 or more to 10,000 or less, more preferably from 5 or more to 5,000 or less, and still more preferably from 10 or more to 4,000 or less.

The block polymer compound of the present invention may also preferably contain a polyalkenyl ether structure as repeating structural units. The polyalkenyl ether structure may preferably be in a content of 50 mol % or more. A polymer having the polyalkenyl ether structure in the backbone chain has a low glass transition point Tg, and can be flexible in molecular motion. In order for a functional substance to be improved in dispersion stability and be improved in includability (enclosability), the block polymer may be more flexible in molecular motion. This is preferable because the polymer has sites where it becomes physically entangled with particle surfaces of the functional substance to readily have an affinity therefor. Moreover, it may preferably be flexible also in that a coat layer can be formed with ease on a recording medium as will be detailed later. The backbone chain of the block polymer may preferably have a glass transition temperature Tg of 20° C. or less, more preferably 0° C. or less, and still more preferably −20° C. or less.

The block polymer compound of the present invention may also contain a segment which causes phase changes of from hydrophilic to hydrophobic and also from hydrophobic to hydrophilic, in response to stimuli, e.g., depending on stimuli such as changes in temperature, exposure to electromagnetic waves, changes in pH, changes in concentration, and so forth.

The block polymer compound of the present invention may be a block polymer compound having at least two block segments which is a block polymer compound characterized in that one block segment of these segments is a copolymerization containing the repeating structural unit represented by the general formula (1) and having a sulfonic acid derivative and the repeating structural unit represented by the general formula (2) and having a carboxylic acid derivative, and the other block segment may contain a stimulus-responsive block segment. The stimulus may preferably be any of changes in temperature, exposure to electromagnetic waves, changes in pH and changes in concentration, any of which may be used in combination.

As a specific example of such a block polymer compound of the present invention, having the stimulus-responsive properties, it may include, but is not limited to, an AB di-block polymer which has, as a hydrophobic segment, as a repeating structural unit, capable of showing stimulus response to temperature; and is formed of, as a hydrophilic segment, a copolymer of a repeating structural unit having a sulfonic acid group, and a repeating structural unit having a carboxylic acid group, Incidentally, the hydrophobic segment is a block segment which shows a response to the stimulus of temperature, showing hydrophobicity at about 20° C. or more and showing hydrophilicity below that temperature. This has been ascertained also by DSC (differential scanning calorimetry).

The polymerization for obtaining the block polymer compound of the present invention is often carried out by cationic polymerization, anionic polymerization, radical polymerization or the like. In the case of the cationic polymerization, an initiator may include, as its examples, protonic acids such as hydrochloric acid, sulfuric acid, methanesulfonic acid, trifluoroacetic acid, trifluoromethanesulfonic acid and perchloric acid, and combinations of a cationic source with any of Lewis acids such as $BF_3$, $AlCl_3$, $TiCl_4$, $SnCl_4$, $FeCl_3$, $RAlCl_2$ and $R_{1.5}AlCl_{1.5}$ (R represents an alkyl group) (The cationic source may include protonic acids, water, alcohols, and addition products of vinyl ether and sulfonic acids). Any of these initiators may be made present together with a polymerizable compound (monomer) to cause polymerization reaction to proceed to synthesize the block polymer compound.

A polymerization method more preferably usable in the present invention is described. Methods for synthesizing polymers containing polyvinyl ether structures are reported, among which a method by cationic living polymerization by Aoshima et al. (Polymer Bulletin Vol. 15, 1986, p. 417; Japanese Patent Applications Laid-open No. H11-322942) is typical. Where polymers are synthesized by cationic living polymerization, homopolymers or copolymers composed of two or more components of monomers and also various polymers such as block polymers graft polymers and gradient polymers can be synthesized in lengths (molecular weights) uniformed accurately. Also, the living polymerization may besides be carried out in an $HI/I_2$ system, an $HCl/SnCl_4$ system or the like.

The polymer of the present invention is characterized in that it is the polymer containing a repeating structural unit having in the side chain a sulfonic acid derivative and a repeating structural unit having in the side chain a carboxylic acid derivative. Such a polymer formed by copolymerization of repeating structural units having ionic functional groups having different pKa enables control of the degree of dissociation of protons or cations such ionic functional groups have, by differences in pH. This also enables formation of a more highly dimensional and more precise structure than a polymer having only ionic functional groups having the same pKa.

A second category of the present invention is described below.

The second category of the present invention is a polymer-containing composition characterized by the containing of a solvent or a dispersion medium, a functional substance and the first-category polymer of the present invention. The composition contains the polymer described above and a functional substance capable of exhibiting a useful and stated function, such as a coloring material, and the polymer may favorably be used to disperse well the functional substance and so forth. The functional substance may preferably be a liquid one or a solid one, or may be a soluble substance. For example, usable are oils, pigments, metals, herbicides, insecticides, biological materials, medicines, dyes, molecular catalysts and so forth.

The first-category polymer contained in the polymer-containing composition of the present invention may be in an amount of from 0.1 to 99% by weight, and preferably from 0.3 to 70% by weight, based on the weight of the polymer-containing composition of the present invention. If it is in an amount of less than 0.1% by weight, the functional substance may have an insufficient dispersibility. If it is in an amount of more than 99% by weight, a too high viscosity may result. Also, the functional substance contained in the polymer-containing composition of the present invention may be in an amount of from 0.1% by weight or more to 80% by weight or less, and preferably from 0.5% by weight or more to 60% by weight or less, based on the weight of the polymer-containing composition. As long as it is in an amount of 0.1% by weight or more, preferable functional characteristics can be achieved. As long as it is in an amount of 80% by weight or less, a preferable dispersibility can be achieved.

The polymer-containing composition of the present invention further contains a solvent or a dispersion medium. A binder resin may also be used as the dispersion medium. Water, a water-soluble solvent, a water-insoluble organic solvent or the like may be used as the solvent or the dispersion medium. Of course, a mixture of any of these may also be used.

Examples of the water-soluble solvent include, e.g., polyhydric alcohols such as ethylene glycol, diethylene glycol, triethylene glycol, polyethylene glycol, propylene glycol, polypropylene glycol and glycerol; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methyl-2-pyrrolidone, substituted pyrrolidone, and triethanolamine. Also, usable are monohydric alcohols such as methanol, ethanol and isopropyl alcohol. As the water-insoluble organic solvent, usable are hydrocarbon type solvents such as hexane, heptane, octane, decane and toluene, and solvents such as cyclohexanone, acetone, methyl ethyl ketone, and butyl acetate. Natural fats and oils such as olive oil, soy bean oil, beef tallow and lard may also be used. The binder resin may include, e.g., styrene-acrylate copolymers and polyesters.

The solvent or the dispersion medium may be contained in the polymer-containing composition of the present invention in an amount of from 1% by weight or more to 99% by weight or less, and preferably from 10% by weight or more to 95% by weight or less, based on the weight of the polymer-containing composition. As long as it is in an amount of from 1% by weight or more to 99% by weight or less, a preferable dispersibility for the functional substance can be achieved.

The polymer-containing composition of the present invention is also not precluded from containing a component(s) other than the foregoing, and may contain additives such as an ultraviolet absorbent, an antioxidant and a stabilizer.

In order to bring out the above function sufficiently, as the above polymer, it is preferable to use the block polymer compound of the present invention, and it is more preferable that the block polymer compound is amphiphilic.

In the present invention, in the case in which the block polymer compound is used, there is used a block polymer compound that contains, as a characteristic feature, the copolymer of the repeating structural unit having a sulfonic acid derivative, having a small pKa, and the repeating structural unit having a carboxylic acid derivative, having a larger pKa than the former. This also enables formation of a more highly dimensional and more precise structure. For example, the AB di-block polymer described previously may be used, and a coloring material and water as the solvent may be used, to prepare a dispersion. This enables the coloring material to be enclosed in micelles that the AB di-block polymer forms, and also enables formation of an ink composition of such a coloring material enclosed type. It also enables particles of such a disperse composition to have a very regular and uniform particle diameter. It further enables the composition to have a very stable state of dispersion, and also enables control, by pH, of the state of the disperse composition and the degree of dissociation of protons or cations that the ionic functional groups have. For example, it is possible to cause thickening in a pH range where the carboxylic acid associates, and, in a pH range other than that, to make viscosity lower on account of the dissociation of the sulfonic acid or the dissociation of the carboxylic acid. Utilization of such characteristic features also enables utilization to pH sensors, pH-sensitive materials and so forth. Also, when used as an ink composition, the composition can be stably dispersed in an image forming apparatus, and this enables improvement in image recording characteristics.

Incidentally, as one of means for confirming the inclusion in micelles, a means is available in which this ink composition is analyzed by instrumental analysis such as electron microscopy or X-ray diffraction which are of various types. For example, EF-TEM (energy-filtering transmission electron microscopy) observation may be made by cryotransfer to observe spherical micelles. The sample obtained may be put to elementary analysis by EELS (electron energy loss spectroscopy), whereby it can be confirmed that the coloring material is enclosed in the micelles. Also, the state of enclosure may indirectly be confirmed by separating the coloring material from the solvent independently from the polymer under conditions where the micelle may collapse. For example, the block segment described previously, which can undergo phase changes on its solvent-phobic to solvent-philic by the aid of a certain stimulus, may be used as a solvent-phobic segment of the present invention, and this enables the confirmation. This segment may be used to prepare an ink composition in which a coloring material insoluble in the solvent stands enclosed in micelles, and the solvent-phobic segment may be made to undergo a phase change to the solvent-philic segment by the aid of the stimulus, where, if the coloring material precipitates, it follows that its enclosure in micelles has been suggested. Thus, this can be used as a means for confirming the enclosure.

The ink composition that is a preferred embodiment of the polymer-containing composition of the present invention is further described.

The first-category block polymer compound (polymer) of the present invention to be contained in the ink composition of the present invention may be used in an amount ranging from 0.1% by weight or more to 90% by weight or less, and preferably from 0.3% by weight or more to 80% by weight or less, based on the weight of the ink composition. When used in ink-jet printers, it may be used in an amount of from 0.3% by weight or more to 30% by weight or less.

Components other than the block polymer compound to be contained in the ink composition of the present invention are described below in detail. Such other components include water, a water-soluble solvent, a coloring material, and additives. What has previously been described as examples also applies as examples of some of these components.

The coloring material may typically include a pigment and a dye. The pigment may be either of an organic pigment and an inorganic pigment. As pigments used in the ink composition, a black pigment and cyan, magenta and yellow pigments as three primary color pigments may preferably be used. Incidentally, color pigments other than the above, colorless or pale-color pigments, or metalescent pigments and the like may also be used. In the present invention, commercially available pigments or pigments newly synthesized may also be used. Also, the pigment may be used in combination with the dye.

Pigments commercially available as black, cyan, magenta and yellow pigments are exemplified below.

The black pigments may include, but are not limited to, RAVEN 1060 (trade name; available from Columbian Carbon Japan Limited); MOGUL-L (trade name; available from Cabot Corp.); COLOR BLACK FW1 (trade name; available from Degussa Corp.); and MA100 (trade name; available from Mitsubishi Chemicals, Inc.).

The cyan pigments may include, but are not limited to, C.I. Pigment Blue 15:3, C.I. Pigment Blue 15:4 and C.I. Pigment Blue 16.

The magenta pigments may include, but are not limited to, C.I. Pigment Red 122, C.I. Pigment Red 123 and C.I. Pigment Red 146.

The yellow pigments may include, but are not limited to, C.I. Pigment Yellow 74, C.I. Pigment Yellow 128 and C.I. Pigment Yellow 129.

In the ink composition of the present invention, a pigment that is self-dispersible in water may be used. Such a water-dispersible pigment includes a pigment that uses the effect of steric hindrance, which makes a polymer adsorb on pigment particle surfaces, and a pigment that uses the electrostatic repulsion force. Such pigments may include commercially available products such as CAB-O-JET 200 and CAB-O-JET 300 (both are trade names; available from Cabot Corp.), and Microjet Black CW-1 (trade name; available from Orient Chemical Industries, Ltd.). The pigment used in the ink composition of the present invention may preferably be in an amount of from 0.1 to 50% by weight based on the total weight of the ink composition. As long as the pigment is in an amount of 0.1% by weight or more, preferable image density can be achieved, and as long as it is in an amount of 50% by weight or less, preferable dispersibility can be achieved. A more preferable range for the amount of pigment is from 0.5 to 30% by weight.

The dye may also be used in the ink composition of the present invention. Usable are water-soluble dyes such as direct dyes, acid dyes, basic dyes, reactive dyes and food dyes, and oil-soluble dyes, or insoluble dyes such as disperse dyes, which are as listed below.

For example, water-soluble dyes may include direct dyes such as C.I. Direct Black 17, 62, 154; C.I. Direct Yellow 12, 87, 142; C.I. Direct Red 1, 62, 243; C.I. Direct Blue 6, 78, 199; C.I. Direct Orange 34, 60; C.I. Direct Violet 47, 48; C.I. Direct Brown 109; and C.I. Direct Green 59; acid dyes such as C.I. Acid Black 2, 52, 208; C.I. Acid Yellow 11, 29, 71; C.I. Acid Red 1, 52, 317; C.I. Acid Blue 9, 93, 254; C.I. Acid Orange 7, 19; and C.I. Acid Violet 49; reactive dyes such as C.I. Reactive Black 1, 23, 39; C.I. Reactive Yellow 2, 77, 163; C.I. Reactive Red 3, 111, 221 C.I. Reactive Blue 2, 101, 217; C.I. Reactive Orange 5, 74, 99; C.I. Reactive Violet 1, 24, 38; C.I. Reactive Green 5, 15, 23; and C.I. Reactive Brown 2, 18, 33; basic dyes such as C.I. Basic Black 2; C.I. Basic Red 1, 12, 27; C.I. Basic Blue 1, 24; C.I. Basic Violet 7, 14, 27; and food dyes such as C.I. Food Black 1, 2.

Oil soluble dyes of several colors are exemplified by the following commercially available products.

Examples of a black oil-soluble dye include, but are not limited to, C.I. Solvent Black 3, 22:1, 50.

Examples of a yellow oil-soluble dye include, but are not limited to, C.I. Solvent Yellow 1, 25:1, 172.

Examples of an orange oil-soluble dye include, but are not limited to, C.I. Solvent Orange 1, 40:1, 99.

Examples of a red oil-soluble dye include, but are not limited to, C.I. Solvent Red 1, 111, 229.

Examples of a violet oil-soluble dye include, but are not limited to, C.I. Solvent Violet 2, 11, 47.

Examples of a blue oil-soluble dye include, but are not limited to, C.I. Solvent Blue 2, 43, 134.

Examples of a green oil-soluble dye include, but are not limited to, C.I. Solvent Green 1, 20, 33.

Examples of a brown oil-soluble dye include, but are not limited to, C.I. Solvent Brown 1, 12, 58.

The dye used in the ink composition of the present invention may preferably be in an amount of from 0.1 to 50% by weight based on the total weight of the ink composition. A more preferable range for the amount of the dye is from 1 to 40% by weight. Incidentally, these examples of the coloring material as have been given above are those preferable for the ink composition of the present invention. The coloring material used in the ink composition of the present invention is not particularly limited to the foregoing coloring materials.

As the solvent, any of water, a water-soluble solvent and an organic solvent may be used. Water may preferably be used. As the water, preferred are ion-exchanged water, pure water and ultrapure water, from which metallic ions and so forth have been removed.

The water may be contained in the ink composition of the present invention in an amount of from 1 to 95% by weight, and more preferably be contained in an amount of from 5 to 90% by weight. In the amount in the range of from 1 to 95% by weight, the effect of dispersion can be more remarkable, and a more uniform state of dispersion of the functional substance can be materialized.

Examples of the water-soluble solvent include, e.g., polyhydric alcohols such as ethylene glycol, diethylene glycol, triethylene glycol, polyethylene glycol, propylene glycol, polypropylene glycol and glycerol; polyhydric alcohol ethers such as ethylene glycol monomethyl ether, ethylene glycol monoethyl ether, ethylene glycol monobutyl ether, diethylene glycol monoethyl ether and diethylene glycol monobutyl ether; and nitrogen-containing solvents such as N-methyl-2-pyrrolidone, substituted pyrrolidone, and triethanolamine. Also, as uses of inks, monohydric alcohols such as methanol, ethanol and isopropyl alcohol may be used for the purpose of accelerating the drying on paper (recording mediums).

The water-soluble solvent may be contained in the ink composition of the present invention in an amount of from 0.1 to 50% by weight, and more preferably be contained in an amount of from 0.5 to 40% by weight. In the amount in the range of from 0.1 to 50% by weight, the effect of wetting can be more remarkable, and a more uniform state of dispersion of the functional substance can be materialized.

The block polymer used in the ink composition of the present invention may be in a content of from 0.1 to 90% by weight, and preferably from 0.3 to 80% by weight. If the block polymer is in a content of less than 0.1% by weight, the pigment contained in the ink composition of the present invention may be unable to be sufficiently dispersed. If it is in a content of more than 90% by weight, the ink compositions may have too high viscosity.

The ink composition of the present invention may also preferably be used as an ink-jet recording ink.

How to prepare the ink-jet recording ink in the present invention is described next.

-Preparation of Ink-Jet Recording Ink-

As a method for preparing the ink-jet recording ink composition of the present invention, the pigment, the block polymer compound of the present invention, the additives and so forth may be added to the ion-exchanged water and dispersed therein by means of a dispersion machine, thereafter coarse particles are removed by means of a centrifugal separator or the like, and then the water or solvent, the additives and so forth are added, followed by stirring, mixing and filtration. This may be given as an example.

As the dispersion machine, available are, e.g., an ultrasonic homogenizer, a laboratory homogenizer, a colloid mill, a jet mill, a ball mill and so forth. Any of these may be used alone or in combination.

In the case when the self-dispersible pigment is used, too, the ink composition may be prepared in the same procedure as the above.

The ink composition of the present invention is also applicable to a toner composition. This is described below.

-Toner Composition-

The toner composition of the present invention contains, stated specifically, a dispersion medium such as a binder resin, a coloring material and the polymer described above, of the present invention.

The polymer of the present invention to be contained in the toner composition of the present invention may be in an amount ranging from 0.1% by weight or more to 90% by weight or less, which may herein preferably be from 0.5% by weight or more to 80% by weight or less, based on the total weight of the toner composition.

The polymer of the present invention may also be used as the binder resin itself, and may still also be used together with a binder resin such as a styrene-acrylic resin, a polyester resin or the like.

Components other than the polymer to be contained in the toner composition of the present invention are described below in detail. Such other components may include a binder resin, a coloring material (a pigment or a dye), a charge control agent, a release agent, an external additive, and magnetic particles.

Example of the binder resin include, e.g., styrene-acrylic copolymers, polyesters and polycarbonates. The binder resin may preferably be in a content of from 10% by weight or more to 99% by weight or less based on the total weight of the toner composition.

Usable as the coloring material are the pigment and the dye that have been described in the description of the ink composition. The coloring material may be used in a content of from 0.1% by weight or more to 50% by weight or less. Examples of the charge control agent include, e.g., metal-azo complexes, triphenylmethane dyes, Nigrosine, and ammonium salts. The charge control agent may be used in a content of from 0.1% by weight or more to 30% by weight or less.

Examples of the release agent include synthetic waxes and naturally occurring waxes.

Examples of the external additive include, e.g., inorganic fine particles such as fine silica, alumina or titania particles; and fine resin particles such as fine polyvinylidene fluoride (PVDF) or polytetrafluoroethylene particles.

Examples of the magnetic particles include, e.g., magnetite, hematite or ferrite particles.

The toner composition of the present invention can function as such even if it does not necessarily contain all the above components, and may also contain components not described in the foregoing.

As a method for producing the toner composition of the present invention, the following method is available. For example, the constituents described above are mixed and melt-kneaded so as to be uniformly mixed, and thereafter the mixture obtained is pulverized by means of a speed mill or a jet mill to produce toner particles, followed by classification to obtain toner particles having the desired particle size. To the toner particles (toner base particles) obtained, the external additive may be added, followed by mixing by means of a mixer to produce the toner composition.

The ink applying method and image forming method of the present invention are described next.

-Ink Applying Method & Image Forming Method-

The ink composition of the present invention may be used in various image forming methods and apparatuses carrying out or making use of various kinds of printing, ink-jet recording, electrophotography and so forth. Images can be drawn by an image forming method making use of such apparatuses. Also, the ink composition may be used to form minute patterns by ink-jet recording or the like, or a liquid composition may be used in a liquid-applying method for administering medicines.

The image forming method of the present invention is a method of forming much superior images by using the ink composition of the present invention. The image forming method of the present invention may preferably be an image forming method in which the ink composition of the present invention is ejected through an ink ejection part to impart the ink composition to a recording medium to perform recording.

The ink-jet recording used may be a known method such as a piezoelectric ink-jet recording system making use of piezoelectric elements, or a BUBBLE JET (registered trademark) recording system which causes heat energy to act on inks to effect bubbling to perform recording. Also, either of a continuous type method and an on-demand type method may be used. Further, the ink composition of the present invention may be used in a recording system in which inks are applied on an intermediate transfer material and thereafter are transferred to a final recording medium such as paper.

The present invention also embraces an ink applying method in which the ink composition and a substance or composition capable of changing the pH of the ink composition are brought into contact with each other to make the ink composition fixed on a recording medium. Various methods are applicable in respect of a method of applying such a substance or composition capable of changing the pH. For example, as disclosed in Japanese Patent Application Laid-open No. S64-63185, polyvalent cations may be shot in over the whole area of a region where images are to be formed using an ink-jet recording head. It is also preferable to previously keep polyvalent cations given to a recording medium.

The image forming apparatus of the present invention is described next.

The ink composition of the present invention may be used in liquid-applying apparatus making use of the above ink applying method, pattern forming apparatus making use of a pattern forming process which forms a stated pattern on a recording medium, various printing processes which form images or characters on a recording medium, and image forming apparatus making use of various image forming processes such as ink-jet recording and electrophotography, and may particularly preferably be used in ink-jet recording apparatus.

The ink-jet recording apparatus making use of the ink-jet recording ink composition of the present invention includes ink-jet recording apparatus of a piezoelectric ink-jet recording system making use of piezoelectric elements, or a BUBBLE JET (registered trademark) recording system which causes heat energy to act on inks to effect bubbling to perform recording.

Figure 1:
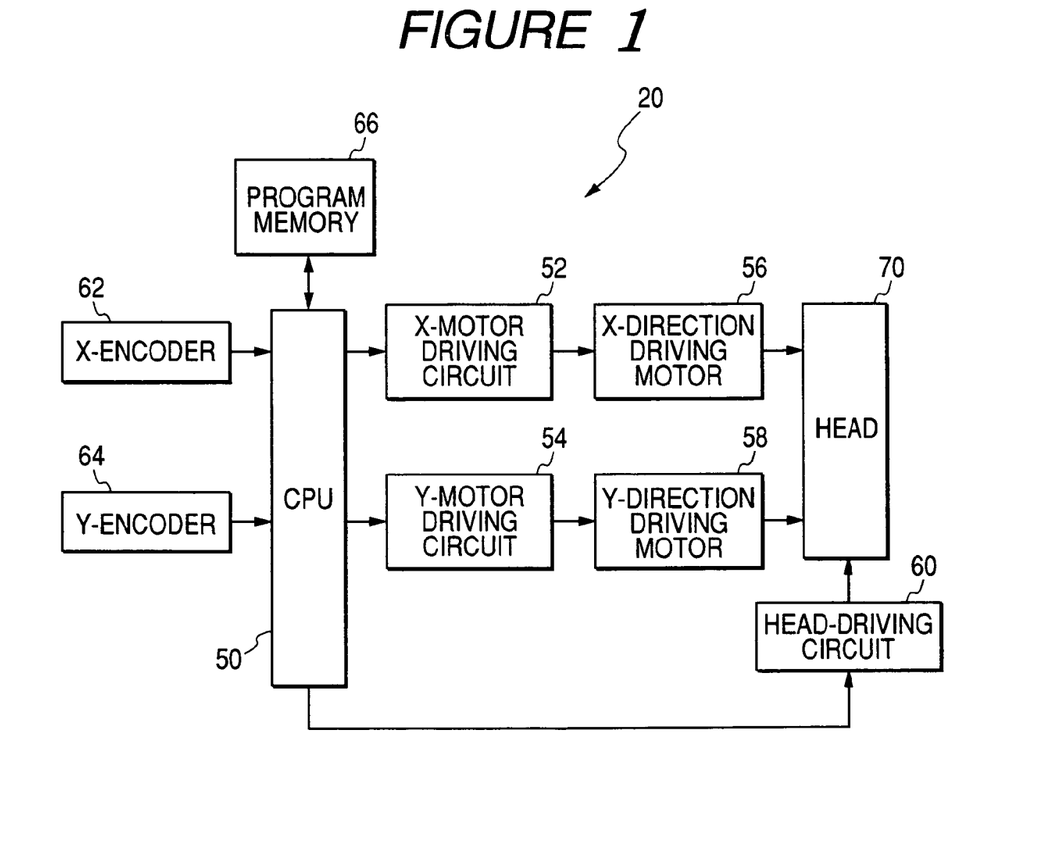
FIG. 1 is a schematic view showing the mechanism of the image forming apparatus of the present invention.

FIG. 1 schematically shows how the ink-jet recording apparatus functions. Reference numeral 50 denotes a central processing unit (CPU) of an ink-jet recording apparatus 20. A program for controlling the CPU 50 may be stored in a program memory 66, or may also be stored in a memory means such as EEPROM (not shown) as a firmwear. In the ink-jet recording apparatus, recording data are received in the program memory 66 from a recording data preparation means (not shown; such as a computer). The recording data may be the information itself of images or characters to be recorded, or may also be one prepared by compressing such information, or may be encoded information. Where such compressed or encoded information is processed, the CPU 50 may be made to perform elongation or expansion to obtain the information of images or characters to be recorded. An X-encoder 62 (relating to, e.g., X-direction or primary scanning direction) and Y-encoder 64 (relating to, e.g., Y-direction or secondary scanning direction) may be provided to notify the CPU 50 of the relative position of a head with respect to a recording medium.

On the basis of the information of the program memory 66, X-encoder 62 and Y-encoder 64, the CPU 50 transmits signals which are to record images, to an X-motor driving circuit 52, a Y-motor driving circuit 54 and a head driving circuit 60. The X-motor driving circuit 52 and the Y-motor driving circuit 54 drive an X-direction driving motor 56 and a Y-direction driving motor 58, respectively, to move a head 70 relatively with respect to the recording medium and move it to a recording position. At a time of point where the head 70 has been moved to the recording position, the head driving circuit 60 transmits signals to the head 70 which are to make it eject every kind of ink composition (Y, M, C, K) or a stimulus-providing substance which is to come into stimuli, to perform recording. The head 70 may be one for ejecting a monochrome ink composition, or may also be one for ejecting a plurality of ink compositions, or may have together the function to eject the stimulus-providing substance which is to come into stimuli.

EXAMPLES

The present invention is described below in greater detail by giving Examples. The present invention is by no means limited to these Examples.

Synthesis Example 1

(Synthesis of Block Polymer)

Synthesis of di-block polymer composed of isobutyl vinyl ether (IBVE: A-block) and random copolymer of methyl 4-(2-vinyloxyethoxy)benzenesulfonate and ethyl 4-(2-vinyloxyethoxy)benzoate (VEOEtPhSO$_3$Me-r-VEOEtPhCOOEt: B-block):

The inside atmosphere of a glass container fitted with a three-way cock was displaced with nitrogen, and thereafter heated to 250° C. in the atmosphere of nitrogen gas to remove adsorbed water. After the system was returned to room temperature, 20 mmols (millimols) of IBVE, 16 mmols of ethyl acetate, 0.1 mmol of 1-isobutoxyethyl acetate and 11 ml of toluene were added, and the reaction system was cooled. At the time the temperature in the system reached 0° C., 0.2 mmol of ethylaluminum sesquichloride (an equimolar mixture of diethylaluminum chloride and ethylaluminum dichloride) was added to initiate polymerization. Molecular weight was time-sharingly monitored using molecular sieve column chromatography (GPC), where the polymerization for the A-block was confirmed to have been completed.

Next, a toluene solution of 1.5 mmols (millimols) of VEOEtPhSO$_3$Me and 1.5 mmols of VEOEtPhCOOEt for the B-block was added to continue polymerization. By monitoring making use of GPC, the polymerization for the B-block was confirmed to have been completed approximately by a half, where the polymerization reaction was stopped. To stop the polymerization reaction, an aqueous 0.3% by weight ammonia/methanol solution was added to the system. The reaction mixture solution obtained was diluted with dichloromethane, followed by washing with 0.6 M hydrochloric acid three times and subsequently with distilled water three times. The organic layer obtained was concentrated and evaporated to dryness by means of an evaporator, and this was vacuum-dried. The vacuum-dried product was repeatedly dialyzed in a methanol solvent by the use of a cellulose semipermeable membrane to remove a monomeric compound, thus the desired product, a di-block polymer, was obtained as the polymer. The compound was identified by NMR and GPC. It had an Mn of 19,500 and Mw/Mn of 1.31. Its polymerization ratio was A:B=200:15. The two kinds of monomers in the B-block were in a polymerization ratio of about 1:1.

The block polymer obtained here was further hydrolyzed in a mixture solution of dimethylformamide, sodium hydroxide and water to obtain a di-block polymer in which the B-block component was hydrolyzed and made into a sodium salt. The compound was identified by NMR and IR.

This polymer was further neutralized with 0.1N hydrochloric acid in a water dispersion to obtain a di-block polymer in which the B-component came into free sulfonic acid and carboxylic acid. The compound was identified by NMR and GPC.

Synthesis Example 2

Synthesis of tri-block polymer composed of 2-(4-methylbenzeneoxy)ethyl vinyl ether (TolOVE: A-block), 2-methoxyethoxyethyl vinyl ether (MOEOVE: B-block) and random copolymer of methyl 4-(2-vinyloxyethoxy)benzenesulfonate and ethyl 4-(2-vinyloxyethoxy)benzoate (VEOEtPhSO$_3$Me-r-VEOEtPhCOOEt: C-block):

The desired tri-block polymer was obtained by carrying out polymerization in the same manner as in Synthesis Example 1 except that 20 mmols of IBVE for the A-block was changed for 10 mmols of TolOVE, 4.5 mmols of MOEOVE for the B-block was added at the time the polymerization for the A-block was completed, and a toluene solution of 1.5 mmols of VEOEtPhSO$_3$Me and 1.5 mmols of VEOEtPhCOOEt for the C-block was added at the time the polymerization for the B-block was completed. The tri-block polymer compound was identified by NMR and GPC. It had an Mn of 21,400 and Mw/Mn of 1.28. Its polymerization ratio was A:B:C=100:45:15. The two kinds of monomers in the C-block were in a polymerization ratio of about 1:1.

The subsequent procedure in Synthesis Example 1 was further repeated to obtain a tri-block polymer in which the C-component came into free carboxylic acid.

Example 1

15 parts by weight of the sulfonic acid salt type/carboxylic acid salt type di-block polymer obtained in Synthesis Example 1 and 7 parts by weight of OIL BLUE-N (trade name; C.I. Solvent Blue-14, available from Aldrich Chemical Co., Inc.) were dissolved together in 150 parts by weight of dimethylformamide, and the solution obtained was converted into an aqueous phase by the use of 400 parts by weight of water to obtain an ink composition. This ink composition was left for 10 days, but the OIL BLUE did not separate to settle.

Example 2

15 parts by weight of the sulfonic acid salt type/carboxylic acid salt type tri-block polymer obtained in Synthesis Example 2 and 7 parts by weight of OIL BLUE-N (trade name; C.I. Solvent Blue-14, available from Aldrich Chemical Co., Inc.) were dissolved together in 150 parts by weight of dimethylformamide, and the solution obtained was converted into an aqueous phase by the use of 400 parts by weight of water to obtain an ink composition. This ink composition was left for 10 days, but the OIL BLUE did not separate to settle.

Example 3

A printing head of an ink-jet printer (trade name: BJF800; manufactured by CANON INC.) was filled with the ink composition prepared in Example 2, and square images of 30 mm×30 mm were solid-printed. As the result, uniform printing was performable. One minute after the printing, printed areas were strongly rubbed with a line marker three times, but the blue color did not blur, to find that the ink showed a very good fixing performance. Also, water was dropped onto the printed areas, where the color did not blur, to find that the print had a very good water resistance.

Comparative Example 1

2 parts by weight of a black self-dispersible pigment (trade name: CAB-O-JET 300; available from Cabot Corp.), 0.5 part by weight of a surface-active agent (trade name: NON-ION E-230; available from Nippon Oil & Fats Co., Ltd.), 5 parts by weight of ethylene glycol and 92.5 parts by weight of ion-exchanged water were mixed to prepare an ink composition. Using this ink composition, printing was performed in the same manner as in Example 3. One minute after the printing, printed areas were strongly rubbed with a line marker once, where black color was seen to have blurred.

Comparative Example 2

15 parts by weight of a styrene-b-styrenesulfonic acid di-block polymer (Mn: 22,800; Mw/Mn: 1.33; polymerization ratio: 150:50) and 7 parts by weight of OIL BLUE-N (trade name; C.I. Solvent Blue 14; available from Aldrich Chemical Co., Inc.) were dissolved together in 150 parts by weight of dimethylformamide, and the solution obtained was converted into an aqueous phase by the use of 400 parts by weight of water to obtain an ink composition.

Using this ink composition, printing was performed in the same manner as in Example 3. Water was dropped onto the printed areas, where the color was seen to have blurred.

Comparative Example 3

15 parts by weight of a styrene-b-acrylic acid di-block polymer (Mn: 18,200; Mw/Mn: 1.20; polymerization ratio: 150:50) and 7 parts by weight of OIL BLUE-N (trade name; C.I. Solvent Blue 14; available from Aldrich Chemical Co., Inc.) were dissolved together in 150 parts by weight of dimethylformamide, and the solution obtained was converted into an aqueous phase by the use of 400 parts by weight of water to obtain an ink composition.

Using this ink composition, printing was performed in the same manner as in Example 3. As a result, rough images (with areas not printed) were seen.

Example 4

On plain paper which was previously sprayed thereon with an aqueous hydrochloric acid solution with pH 4 and then dried, printing was performed using an ink composition with pH 12 which was prepared in the same manner as in Example 2 and using the same ink jet printer as that in Example 3. The print obtained was uniform. One minute after the printing, printed areas were rubbed with a line marker five times, but the blue color did not blur, to find that the ink showed a very good fixing performance. Also, water was dropped onto the printed areas, where the color did not blur, to find that the print had a very good water resistance.

Example 5

The sulfonic acid type/carboxylic acid type tri-block polymer obtained in Synthesis Example 2 was used to prepare a toner composition in the following way.

100 parts by weight of polyester resin (synthesized using bisphenol A, terephthalic acid, n-dodecenylsuccinic acid, trimellitic acid and diethylene glycol in a molar ratio of 20:38:10:5:27), 70 parts by weight of magnetite ($Fe_3O_4$), 2 parts by weight of the above tri-block polymer, 2 parts by weight of triphenylmethane dye and 3 parts by weight of low-molecular weight polypropylene were premixed, followed by melt kneading by means of a rouder. The kneaded product obtained was cooled, followed by crushing by means of a speed mill, thereafter fine pulverization by means of a jet mill, and further classification using a zigzag classifier to obtain toner particles with a volume-average particle diameter of 11 µm.

To 100 parts by weight of the toner particles, 0.4 part by weight of positively chargeable hydrophobic dry-process silica treated with amino-modified silicone oil (viscosity at 25° C: 100 cp; amine equivalent weight: 800) and 0.2 part by weight of spherical PVDF (polyvinylidene fluoride) particles with an average particle diameter of 0.2 µm were added, and these were mixed by means of Henschel mixer to obtain a positively chargeable toner composition. Using this toner composition, copying was performed using a copying machine NP-3525, manufactured by CANON INC., where beautiful copying was performed.

Example 6

30 parts by weight of the sulfonic acid type/carboxylic acid type tri-block polymer obtained in Synthesis Example 2 was dissolved in 150 parts by weight of THF (tetrahydrofuran), and the solution obtained was converted into an aqueous phase by the use of 400 parts by weight of an aqueous NaOH solution to obtain micelle fluids with pH 7, 9, 11 and 12. The viscosity of each fluid was measured, where maximums of viscosity were obtained over low-pH to high-pH ranges.

| pH | Viscosity (cps) |
|----|-----------------|
| 7  | 5.9             |
| 9  | 12.2            |
| 11 | 8.5             |
| 12 | 3.7             |

Example 7

15 parts by weight of the sulfonic acid salt type/carboxylic acid salt type tri-block polymer obtained in Synthesis Example 2 and 7 parts by weight of C.I. Pigment Blue 15:3 were added to 400 parts by weight of an aqueous NaOH solution controlled to pH 9, and the mixture obtained was high-speed stirred for 3 hours by means of a process homogenizer PH91 (manufactured by SMT AG). By direct dispersion carried out here, a high shear was applied to the fluid dispersion because of the viscosity which was made high under weakly alkaline conditions, so that an ink composition having a very good stability was obtained. Its viscosity was 15.2 cps. This ink composition was dialyzed by the use of a cellulose semipermeable membrane to remove excess NaOH to obtain an ink composition with a pH of 7. Its viscosity was 4.7 cps. This ink composition was left for 10 days, but the pigment was not seen to have settled.

Using this ink composition, printing was performed in the same manner as in Example 3. One minute after the printing, printed areas were strongly rubbed with a line marker three times, but the blue color did not blur, to find that the ink showed a very good fixing performance. Also, water was dropped onto the printed areas, where the color did not blur, to find that the print had a very good water resistance.

This application claims priority from Japanese Patent Application No. 2004-139055 filed on May 7, 2004, which is hereby incorporated by reference herein.

What is claimed is:

1. A polymer that comprises a repeating structural unit represented by the following general formula (1) and a repeating structural unit represented by the following general formula (2):

General formula (1)

wherein A represents a substituted or unsubstituted polyalkenyl group; B represents any one of structures selected from —O—, —OCO—, —COO—, CONR$^1$— and —CH$_2$—, where R$^1$ represents a hydrogen atom or a substituted or unsubstituted straight-chain or branched alkyl group having 1 to 3 carbon atoms; D represents a substituted or unsubstituted straight-chain or branched alkylene group having 1 to 15 carbon atoms, and the methylene group in the alkylene group may be substituted by an oxygen atom or an aromatic ring; m represents an integer of 0 to 30 and, when m is 2 or more, each D may be different; E represents a substituted or unsubstituted aromatic ring; n represents an integer of 0 to 10 and, when n is 2 or more, each E' may be different; provided that m+n is 1 or more; and R represents —SO$_3$H, SO$_3$R$^2$ or —SO$_3$—M, where R$^2$ represents a substituted or unsubstituted straight-chain or branched alkyl group having 1 to 5 carbon atoms or a substituted or unsubstituted aromatic ring, and M represents a monovalent or polyvalent cation; and General formula (2)

wherein A represents a substituted or unsubstituted polyalkenyl group; B' represents any one of structures selected from —O—, —OCO—, —COO— and CONR$^1$, where R$^1$ represents a hydrogen atom or a substituted or unsubstituted straight-chain or branched alkyl group having 1 to 3 carbon atoms; D represents a substituted or unsubstituted straight-chain or branched alkylene group having 1 to 15 carbon atoms, and the methylene group in the alkylene group may be substituted by an oxygen atom or an aromatic ring; m represents an integer of 0 to 30 and, when m is 2 or more, each D may be different; E' represents a substituted or unsubstituted alkyl group or aromatic ring; n' represents an integer of 1 to 10 and, when n is 2 or more, each E' may be different; R' represents —COOH, —COO$_2$ or —COO-M, where R$^2$ represents a substituted or unsubstituted straight-chain or branched alkyl group having 1 to 5 carbon atoms or an aromatic ring, and M represents a monovalent or polyvalent cation; and l is 1 or more, wherein the polymer is a block polymer having at least two block segments, and at least one block segment of the block polymer contains a copolymerization composition of the repeating structural unit represented by the general formula (1) and the repeating structural unit represented by the general formula (2).

2. The polymer according to claim 1, which is amphiphilic.

3. The polymer according to claim 1, wherein at least one of the repeating structural units has a polyalkenyl ether structure.

4. A polymer-containing composition that comprises the polymer according to claim 1, a solvent or a dispersion medium, and a functional substance.

5. The polymer-containing composition according to claim 4, wherein the functional substance is enclosed in the polymer.

6. An ink composition that comprises the polymer according to claim 1, a solvent or a dispersion medium, and a coloring material.

7. The ink composition according to claim 6, which is used in a toner.

8. An ink applying method that comprises the step of applying to a medium the ink composition according to claim 6.

9. The ink applying method according to claim 8, wherein the ink composition is brought into contact with a substance or composition capable of changing the pH of the ink composition.

10. The ink applying method according to claim 9, wherein the medium is previously provided with the substance or composition capable of changing the pH of the ink composition.

11. An image forming method that comprises applying to a medium the ink composition according to claim 6 to form an image on the medium.

12. An ink applying apparatus that comprises:
- an ink applying means for causing energy to act on the ink composition according to claim 6 to apply an ink to a medium; and
- a driving means for driving the ink applying means.

13. A medium for image formation which is a medium to which the ink composition according to claim 6 is to be applied to form an image thereon, and comprises a substance or composition capable of changing the pH of the ink composition upon its contact with the ink composition.

* * * * *

UNITED STATES PATENT AND TRADEMARK OFFICE
CERTIFICATE OF CORRECTION

PATENT NO. : 7,423,075 B2  Page 1 of 1
APPLICATION NO. : 11/118401
DATED : September 9, 2008
INVENTOR(S) : Masayuki Ikegami et al.

It is certified that error appears in the above-identified patent and that said Letters Patent is hereby corrected as shown below:

COLUMN 6
Line 62, "COO" should read --CONH--.

COLUMN 14
Line 26, "cause" should read --cause a--.

COLUMN 21
Line 52, "methyl." should read --methyl--.

Signed and Sealed this

Tenth Day of February, 2009

JOHN DOLL
*Acting Director of the United States Patent and Trademark Office*